Aug. 28, 1951  P. H. DANLY ET AL  2,565,760
POWER PRESS FLYWHEEL BEARING LUBRICATING SYSTEM
Filed March 25, 1948
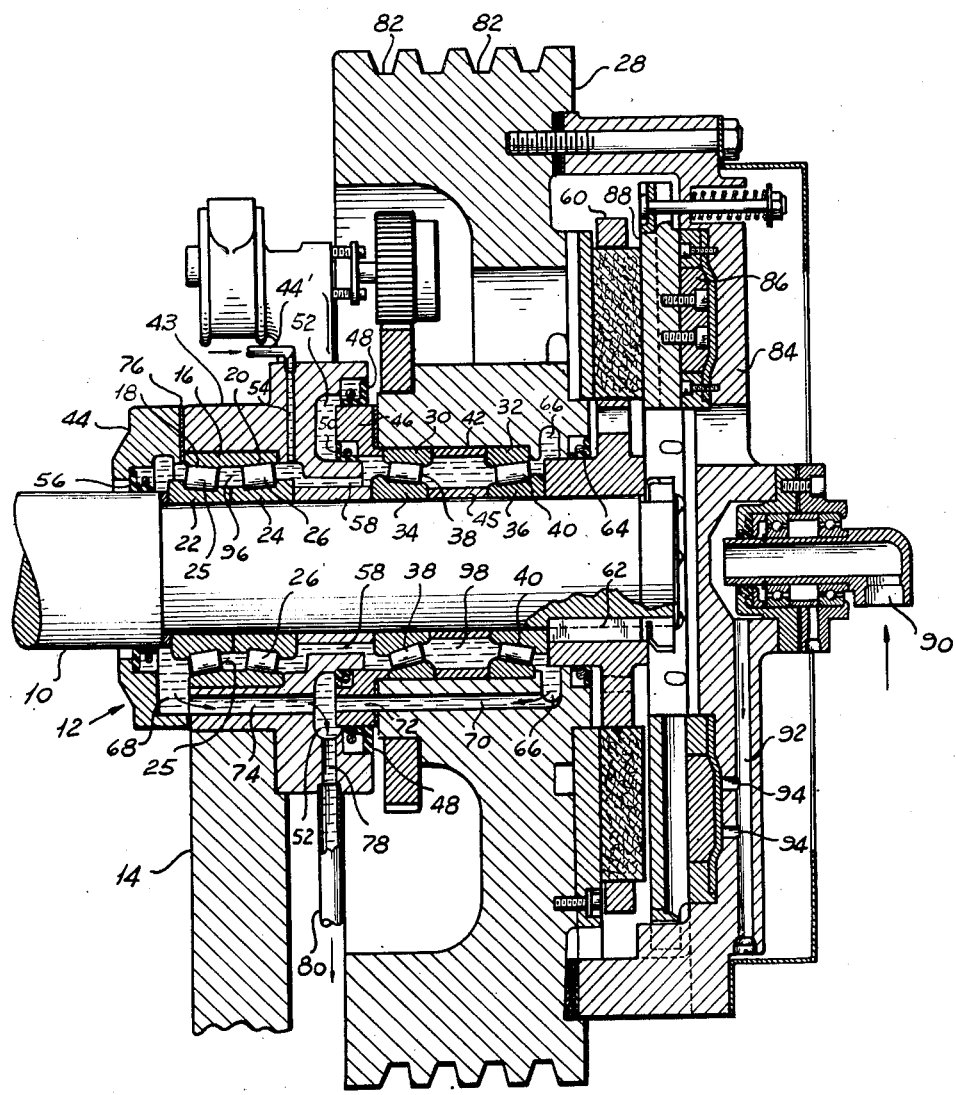
INVENTORS
PHILO H. DANLY
VASIL GEORGEFF
BY
Henry L. Shevier
ATTORNEY Patented Aug. 28, 1951

2,565,760

UNITED STATES PATENT OFFICE 2,565,760

POWER PRESS FLYWHEEL BEARING LUBRICATING SYSTEM

Philo H. Danly, Hinsdale, and Vasil Georgeff, Chicago, Ill., assignors to Danly Machine Specialties, Inc., Chicago, Ill., a corporation of Illinois Application March 25, 1948, Serial No. 16,898

9 Claims. (Cl. 184—6)

Our invention relates to a power press flywheel-bearing lubricating system and more particularly to a lubricating system for power press flywheels in which lubrication is continuously circulated to the flywheel bearing.

Power presses are employed for forming or shaping metal. They are expensive pieces of equipment and are often included in a production line. Not only is it desirable to lengthen their life by proper lubrication but, if failure in a power press forming part of a production line occurs, the interruption of operations of the entire line represents considerable economic loss.

In a power press, the energy required per stroke is substantially the product of the average load and the working distance plus an allowance for friction. In many power presses, especially those performing short stroke operations, the working energy is largely supplied from the kinetic energy stored in the flywheel. This flywheel is constantly driven by a prime mover such as an electric motor which serves largely to return the flywheel to speed during a large part of the cycle in which no work is done.

In the operation of a power press, the continuously running flywheel is adapted to clutch to and unclutch from a power train driving an eccentric or crank.

In the power presses of the prior art, the flywheel bearings have been lubricated by a grease as distinguished from a more fluid lubricant such as a lubricating oil. The grease was supplied to the flywheel bearings by means of a grease cup. If insufficient pressure is applied to the grease, it frequently occurs that insufficient lubrication is supplied to the bearing. If too much pressure is applied to the grease, this pressure may break the seal, permitting grease to leak on to the clutch surfaces and causing slipping. When this occurs, it requires a considerable repair task to disassemble the clutch and the bearing, replace the ruptured grease seals and either clean or replace the clutch lining and the clutch surfaces.

Then too, increased pressure on the grease will increase the heat generated at the flywheel bearing.

One object of our invention is to provide a positive, safe and secure system for lubricating the flywheel bearings of power presses.

Another object of our invention is to provide a lubricating system for power press flywheel bearings in which a lubricating oil is continuously circulated to and removed from the bearing.

Another object of our invention is to provide a circulating oiling system for a flywheel bearing in which the circulating lubricant not only lubricates the bearing but aids in carrying heat generated by friction from the bearing.

Another object of our invention is to provide a continuous circulating system for lubricating the flywheel bearings of power presses in which clean oil is continuously supplied to the bearing, carrying heat and dirt from the bearing, thus prolonging its life.

Still another object of our invention is to provide a lubricating system for flywheel bearings in which the danger of applying an excess pressure sufficient to break the oil seals is avoided.

Other and further objects of our invention will appear from the following description.

The accompanying drawing which forms part of the instant specification and which is to be read in conjunction therewith is a sectional view of a portion of a power press showing the flywheel bearing and one embodiment of a lubricating system in accordance with our invention.

In general, our invention contemplates a structure enabling us to introduce lubricating oil under pressure through a duct to the flywheel bearing and to continuously and constantly drain lubricating oil therefrom in a manner to supply adequate lubricating oil to the flywheel bearing, not only to lubricate it but also to carry heat away from it. The inlet duct to the bearing structure is smaller in diameter than the outlet duct in order to preclude the building up of excessive pressure which would rupture oil seals for the purpose of preventing oil from escaping to the working surfaces of the clutch.

More particularly, referring now to the drawings, a flywheel shaft 10 is journalled in a bearing indicated generally by the reference numeral 12 carried by a pillar block 14 forming part of the press frame. An outer race ring 16 is carried by the pillar block. It will be noted that the outer race ring has a pair of surfaces 18 and 20 sloping away from each other. A pair of inner races 22 and 24 support one end of the power shaft 10 to which the initial driving pinion of the press gear train is attached. A plurality of bearings 25 ride between outer race surface 18 and inner race 22. A plurality of roller bearings 26 ride between outer race surface 20 and inner race 24. The flywheel 28 is carried by a pair of outer races 30 and 32. A pair of inner races 34 and 36 are supported by the end of the shaft 10 projecting beyond the pillar block 14. A plurality of roller bearings 38 are positioned between outer race 30 and inner race 34. A plurality of roller bearings 40 are positioned between inner race 36 and outer race 32. Spacer ring 42 maintains the outer races 30 and 32 in separated position. Spacer ring 45 maintains the inner races 34 and 36 in separated position. The outer race 16 is positioned in a race-carrying member 43 to which is secured a bearing cap 44. A ring 46 is secured to and carried by the flywheel 28. An annular sealing ring 48 provides an oil-tight seal between the race carrier 43 and the ring 46 adjacent its outer periphery. An annular sealing ring 50 provides an oil-tight seal between the race carrier 43 and the inner periphery of the ring 46. It will be observed that the ring 46 and the race carrier form an annular chamber 52. A duct 54 is formed in the race carrier 43 to which the delivery end of an oil-delivery pipe 44' communicates, lubricating oil under pressure being delivered to the pipe 44' as indicated by the arrow. An annular sealing ring 56 provides an oil-tight seal between the shaft 10 and the bearing cap 44. The bearing carrier member 43, which is supported by the pillar block 14, is provided with a plurality of axially-extending ducts 58 providing communication between the exit end of duct 54 and the bearing formed by races 30 and 34 and the bearing rollers 38. A clutch plate 60 is keyed by key 62 to the shaft 10. Since, at those times when the flywheel is not clutched to the clutch plate 60 there will be relative motion between the clutch plate and the flywheel, we provide an annular sealing ring 64 to provide an oil-tight seal between the flywheel hub and the clutch plate hub as can readily be seen by reference to the drawing. The flywheel hub is provided with an annular groove 66 forming a chamber. The bearing cap 44 is provided with an annular recess 68. The lower end of recess 66 communicates with a duct 70 formed in the flywheel 28 and an aligned duct 72, providing communication between the chamber 66 and the annular chamber 52 formed in the bearing carrier member 43. A duct 74 provides a communication between the chamber 52 and the chamber 68 formed in the bearing cap 44. Any suitable means known to the art may be provided for attaching the bearing cap 44 to the bearing carrier 43 such as cap screws or the like. A gasket 76 is provided to insure an oil-tight joint.

A duct 78 provides communication between the annular chamber 52 and a drain pipe 80 through which lubricating oil may be drained to a reservoir whence it is filtered and recirculated by a lubricating oil pump (not shown) to the delivery pipe 44'.

The flywheel is normally continuously driven by a prime mover through a suitable drive such as V-belts which are lodged in the grooves 82 formed in the external periphery of the flywheel 28. The flywheel carries a clutch-operating member 84 comprising a piston 86 adapted to move a clutch plate 88 to the left to clamp the clutch disk 60 between it and the flywheel 28. The piston 86 is actuated by compressed air supplied through pipe 90 and ducts 92 and 94, as will be clearly understood by those skilled in the art.

In operation, oil is supplied under pressure through pipe 44' and duct 54 to the space between the shaft bearing and the flywheel bearing. Oil will flow to the left through the interstices between the bearing rollers 26 into the interroller space 96 and thence through the interstices between the bearing rollers 25 to the annular chamber 68. Oil from the cap chamber 68 flows through duct 78 into the annular chamber 52 and thence through drain pipe 80 to the oil reservoir for filtering and recirculation. At the same time, oil flows through the axial ducts 58 to the bearing rollers 38 of the flywheel bearing and thence through the interstices between the bearing rollers 38 to the interbearing space 98 formed by the spacing rings 42 and 45. Oil then flows through the interstices between bearing rollers 40 carried by outer race 32 and inner race 36 to the annular flywheel chamber 66. Oil from the annular chamber 66 passes through the ducts 70 and 72 to the annular chamber 52 which acts as an oil drain manifold with which the drain pipe 80 communicates.

It will be noted that the drain duct 78 and the drain pipe 80 are of larger cross-sectional areas than the inlet duct 54 and the inlet pipe 44'. We make this provision in order to insure that no pressure will be built up within the bearings which would rupture the annular oil-sealing rings 48, 50, 64 or 56. That the sealing rings retain their integrity is important; first, to prevent the leakage of oil from spraying over the operator of the press or the work and, second, to prevent any oil from leaking on to the co-acting clutch surfaces which would cause slippage of the clutch.

When the clutch is in unclutched position, the shaft 10 is stationary and the flywheel 28 rotates on rollers 38 and 40, there being relative motion between the shaft 10 and the flywheel 28. When the clutch is in clutched position, the shaft 10 rotates at the speed of the flywheel, the shaft rotating on the rollers 25 and 26. Normally therefore only the shaft bearing or the flywheel bearing will be in motion. During the period of transition from unclutched to clutched position and vice versa, there will be brief intervals of time during which both bearings will be in motion.

The clutching and unclutching of the shaft 10 to the flywheel 28 is accompanied by friction in the press. This friction develops heat which is transmitted from the clutch structure to the bearings. Furthermore, the friction at the bearings generates heat. The continuous flow of oil through the bearings not only lubricates them but also carries away a portion of the heat generated, thus permitting the bearings to run at a lower temperature and prolonging their life. Occasionally, in the fitting of the sealing rings during the assembly of the structure, particles of foreign matter and dirt find their way into the bearing. In the prior art, this foreign matter and dirt remains in the bearing and contributes to friction. The provision of a continuous supply of lubricating oil insures that any foreign matter or dirt which might have become lodged in the bearing during its assembly will be flushed clear of the bearing.

It will be seen that we have accomplished the objects of our invention. We have provided a safe, positive and secure system for lubricating flywheel bearings of power presses in which a lubricating oil is continuously circulated to and removed from the bearings. We have provided a circulating oiling system for flywheel bearings in which a circulating lubricant not only oils the bearings but aids in carrying heat generated by friction from the bearings. We have provided a continuous circulating oiling system for flywheel bearings in power presses in which clean oil is continuously supplied to the bearings carrying heat and dirt therefrom, thus prolonging its life. We have provided a circulating system for supplying oil under pressure to a flywheel bearing of a power press in which the danger of obtaining an excessive pressure sufficient to break the oil seals is avoided.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

What we claim is:

1. A power press flywheel bearing assembly including in combination a power press frame, a shaft bearing supported by the frame, a press shaft journaled in the shaft bearing, a flywheel bearing carried by the shaft, a flywheel rotatably mounted on the flywheel bearing, means forming a lubricant supply duct providing communication between the shaft bearing and the flywheel bearing, means forming a lubricant supply passageway communicating with the lubricant supply duct, means forming a lubricant discharge chamber adjacent the shaft bearing, means forming a lubricant discharge chamber adjacent the flywheel bearing, means forming a lubricant discharge duct providing communication between said discharge chambers, and means forming a lubricant discharge passageway communicating with the discharge duct.

2. A power press flywheel bearing assembly as in claim 1 in which said lubricant supply passageway has a smaller cross-sectional area than said lubricant discharge passageway.

3. A power press flywheel bearing assembly as in claim 1 in which said means forming the lubricant supply duct comprises stationary and rotatable means and sealing means adapted to form an oil tight joint between said stationary and rotatable means.

4. A power press flywheel bearing assembly as in claim 1 in which said lubricant discharge duct includes stationary and rotatable means and sealing means adapted to provide an oil tight joint between said stationary and rotatable means.

5. A power press flywheel bearing assembly as in claim 1 in which said means forming a lubricant discharge duct includes a stationary annular chamber and a rotatable member extending into said chamber and sealing means for providing an oil tight joint between said chamber and said rotatable member, said lubricant discharge passageway communicating with said annular chamber.

6. A power press flywheel bearing assembly as in claim 1 in which said means forming a lubricant discharge chamber adjacent the shaft bearing comprises a bearing cap formed with a chamber, an opening in said cap for the passage of said shaft and sealing means between said shaft and said cap.

7. A power press flywheel bearing assembly as in claim 1 in which said means forming a lubricant discharge chamber adjacent the flywheel bearing comprises an annular reentrant portion formed in the hub of the flywheel and means for sealing said chamber and said shaft in oil tight relation.

8. A power press flywheel bearing assembly as in claim 1 in which said shaft bearing comprises a single outer race, a pair of inner races and rollers between the outer race and the inner races.

9. A power press flywheel bearing assembly as in claim 1 in which said flywheel bearing comprises a pair of outer races and a pair of inner races, rollers between said races and a pair of spacing rings for holding said outer and inner races in predetermined spaced relation.

PHILO H. DANLY.
VASIL GEORGEFF.

REFERENCES CITED

The following references are of record in the file of this patent:

UNITED STATES PATENTS

| Number | Name | Date |
| --- | --- | --- |
| 1,536,339 | Gunn | May 5, 1925 |
| 1,923,387 | Nelson | Aug. 22, 1933 |
| 2,014,425 | Crawford | Sept. 17, 1935 |
| 2,335,557 | Winther | Nov. 30, 1943 |

FOREIGN PATENTS

| Number | Country | Date |
| --- | --- | --- |
| 505,181 | Germany | Aug. 14, 1930 |